United States Patent
Brachfeld

(12) 
(10) Patent No.: US 6,564,582 B1
(45) Date of Patent: May 20, 2003

(54) ADJUSTABLE LENGTH NECKLACE AND BRACELET

(76) Inventor: Susan H. Brachfeld, 3514 Three Springs Dr., Westlake Village, CA (US) 91361

( * ) Notice: Subject to any disclaimer, the term of this patent is extended or adjusted under 35 U.S.C. 154(b) by 112 days.

(21) Appl. No.: 09/658,967

(22) Filed: Sep. 11, 2000

(51) Int. Cl.$^7$ ................................................ A44C 5/00
(52) U.S. Cl. ................ 63/3.2; 63/3; 63/3.1; 63/10; 24/115 H; 24/116 R; 24/129 D
(58) Field of Search ................... 63/3, 3.1, 3.2, 63/5.1, 10; 24/115 H, 116 R, 129 D

(56) References Cited

U.S. PATENT DOCUMENTS

| | | | | |
|---|---|---|---|---|
| 118,294 A | * | 8/1871 | Steven | 63/21 |
| 1,124,518 A | * | 1/1915 | Qvarnstrom | 24/115 H |
| 1,704,919 A | | 3/1929 | Murray | |
| 1,738,371 A | * | 12/1929 | Jenckes | 24/574.1 |
| 1,795,674 A | * | 3/1931 | Potter | 24/574.1 |
| 2,159,223 A | * | 5/1939 | Okun | 24/3.6 |
| 2,291,089 A | * | 7/1942 | Okun | 24/3.13 |
| 2,457,195 A | * | 12/1948 | Bagnall, Jr. | 24/3.13 |
| 2,462,425 A | | 2/1949 | Pratt et al. | |
| 2,637,884 A | | 5/1953 | Morehouse | |
| 2,713,706 A | * | 7/1955 | Biagi | 24/66.2 |
| 3,187,396 A | | 6/1965 | Carroll | |
| 3,974,545 A | | 8/1976 | Lossini | |
| 4,321,804 A | * | 3/1982 | Borofsky et al. | 63/3.2 |
| 4,334,413 A | * | 6/1982 | Gaston et al. | 63/3.2 |
| 5,720,049 A | * | 2/1998 | Clutton | 2/207 |
| 2001/0054299 A1 | * | 12/2001 | White | 63/23 |
| 2002/0005047 A1 | * | 1/2002 | Beard | 63/3 |

FOREIGN PATENT DOCUMENTS

GB     16468     11/1887

* cited by examiner

*Primary Examiner*—Teri Pham Luu
*Assistant Examiner*—Andrea Chop
(74) *Attorney, Agent, or Firm*—David O'Reilly

(57) ABSTRACT

An adjustable length bracelet or necklace in which a chain link is formed in a continuous loop and passes through a pair of oval-shaped barrels. The chain loops around and is attached to each oval-shaped barrel by an aperture in the side of the barrel forming an elegantly simple construction. A super slick deformable resistant resilient material inside the oval-shaped barrels resiliently holds the barrels in an adjusted position. Sliding the oval-shaped barrels on the links of the chain adjusts the diameter of the necklace from a maximum to a minimum or anywhere in between. Preferably the oval-shaped barrels are constructed of a memory metal that is super elastic and is highly resistant to distortion. A nickel-titanium shaped memory alloy would be suitable. Also disclosed is an ankle or wrist bracelet linked to a ring to be worn on a finger or a toe. The bracelet is linked to the ring by a pair of chains connected to loops on the bracelet or it can be continuous chains passing from the ring to the clasp for attachment to an ankle or wrist.

3 Claims, 4 Drawing Sheets

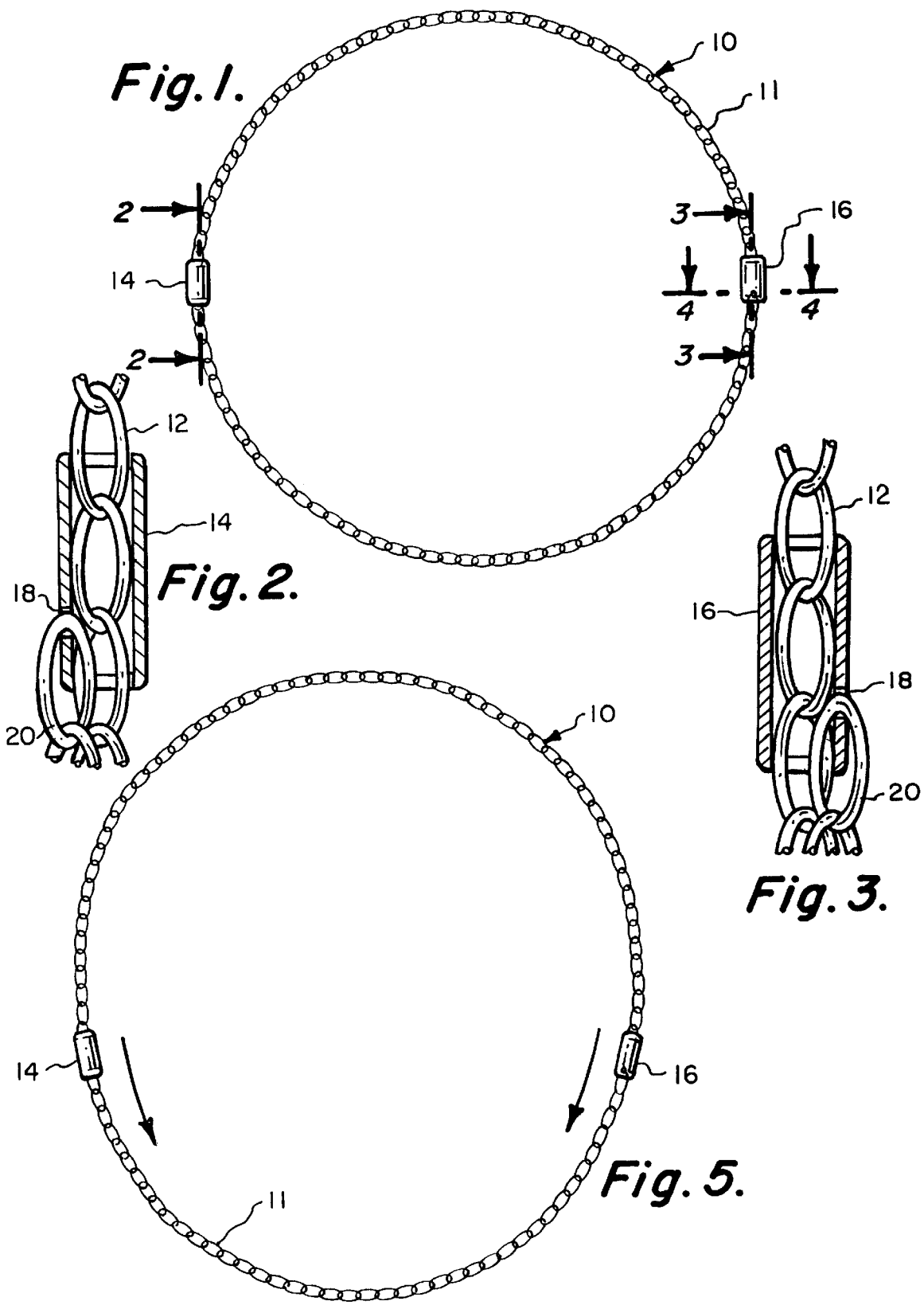

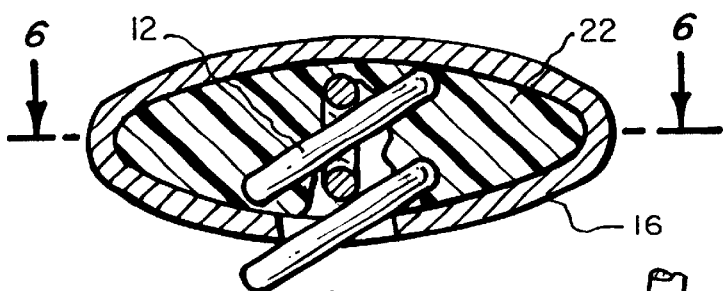
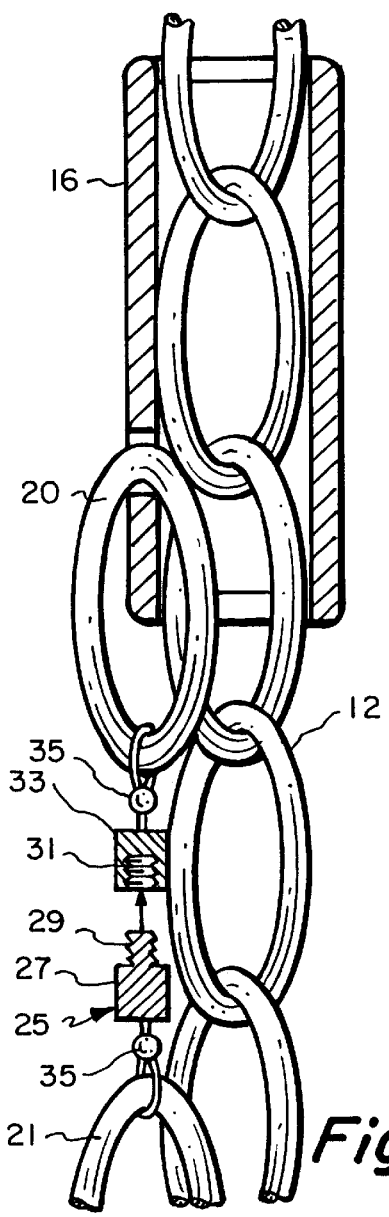
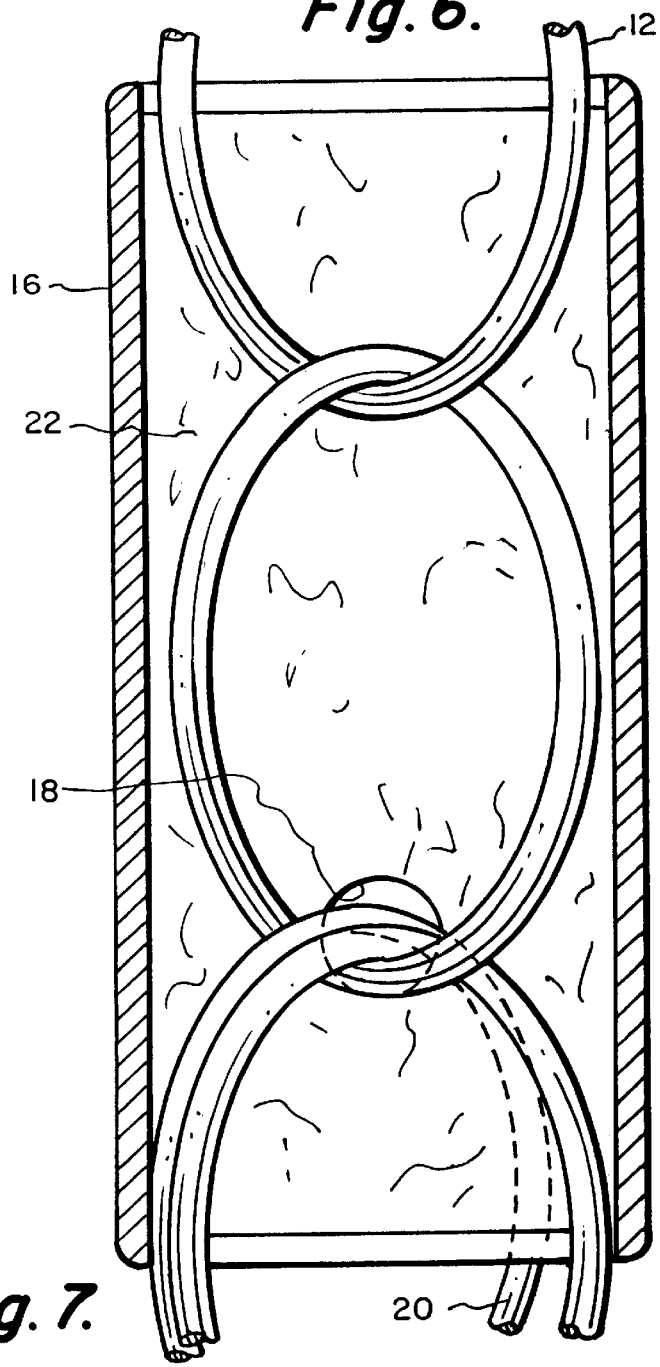
Fig. 4.
Fig. 6.
Fig. 7.

ADJUSTABLE LENGTH NECKLACE AND BRACELET

BACKGROUND OF THE INVENTION

1. Field of the Invention

This invention relates to jewelry generally, more particularly relates to an adjustable length necklace or a bracelet, ring combination for the ankle or wrist.

2. Background Information

Generally bracelets, necklaces, and other jewelry are manufactured in various sizes requiring the accumulation of several to suit different situations and conditions. For different styles, the different necklaces and bracelets may be worn. In some cases it would be advantageous to have one necklace that can be adjusted lengthwise to change the appearance for different styles.

Adjustable length necklaces are known and such devices are disclosed in U.S. Pat. No. 4,334,413 issued Jun. 15, 1982 to Gaston et al and U.S. Pat. No. 1,124,518 issued Jan. 12, 1915 to E. J. Qvarnstrom. This adjustable necklace has a length of chains with first and second ends each anchored in one pair of adjustable elements. The difficulty with this particular necklace is that it is complicated in construction and costly to produce. The linking devices to make it adjustable are comprised of adjustable elements constructed of terminal blocks attached to the ends of the chain housed in trapezoidal casing elements which enclose a resilient member. The casings snap together around the resilient member and terminal block allowing the adjustable elements to slide on the chain. This construction is for the purpose of avoiding the use of soldering operations generally used to produce attaching elements for necklaces. However this construction has a number of complicated elements which increase the cost and assembly.

The Qvarnstrom patent shows a simple device but is unattractive. In this patent a chain is described that loops back upon itself through a ring and is attached to a ball. The ball has a cylindrical aperture through which the chain passes. The ball is filled with cork to grip the chain. This is an effective arrangement but not very elegant or attractive. The chain clearly appears as a double chain. Other problems with this arrangement is the wear on the chain as it slides through the ring and the lack of smooth operation as links can be caught on the ring when being adjusted.

One object of the present invention is to have an adjustable length necklace that is elegantly simple in construction with a minimum of elements to simplify manufacturing of the necklace.

It is therefore another object of the present invention to provide an adjustable length necklace or bracelet attached to barrels that slide smoothly on the chain and are fastened to the necklace by one of the links in the chain.

Yet another object of the present invention is to provide a continuous loop chain necklace having a first end attached to a barrel slidable on the chain and the opposite end attached to a second slidable barrel allowing the chain to be adjusted from a first minimum circumference with a second maximum circumference that is twice the diameter of the first.

BRIEF DESCRIPTION OF THE INVENTION

The purpose of the present invention is to provide a necklace or bracelet that is adjustable in length but is yet elegantly simple in construction with a minimum of elements.

The necklace of the present invention is to provided by a continuous loop or chain and a pair of oval-shaped barrels smoothly slidable on the chain. The oval-shape of the barrels provides a nearly flat surface on each side facilitating grasping and moving the barrel on the chain. The chain passes through each oval-shaped barrel and is attached to the barrel end by a link in the chain passing through an aperture in the barrel. The opposite end of the chain is likewise attached to the other barrel by a similar construction of a link of the chain passing through a hole or aperture in barrel. The link of the chain is adjusted by grasping the oval-shaped barrels and sliding them on chain to adjust the length of the chain from a minimum diameter to a maximum diameter.

The unique oval shape of the barrels improve their function and appearance. Since these necklaces generally use very small links the barrels must also be small. The oval shape of barrels makes it easier to grasp and slide them. Additionally, the oval shape reduces their silhouette so they do not detract from the aesthetic appearance of the necklace.

Each oval-shaped barrel contains a resilient polyethylene material, such as Chevron PE, manufactured by Chevron Chemical Company, to grip the chain and hold it in an adjusted position. This warp resistant elastomeric material has excellent memory properties and low coefficient of friction to grip firmly but still allow smooth transition of the barrels on the chain.

It also occurred to inventor that after frequent and continued use of the barrels the light weight metal would become fatigued and bend or even break. Gold, for example, is easily distorted unless combined with another metal to provide some strength. For that reason, the oval-shaped barrels are constructed of a memory metal that is highly resistant to permanent deformation yet can have a "springy" feel. The oval-shaped barrels are preferably constructed of a highly distortion-resistant memory metal such as a nickel-titanium super elastic alloy having a shaped memory.

Manufacturing the barrels of the memory metal described above will allow them to be somewhat flexible but prevent any permanent distortion when squeezed. It can facilitate movement on the chain because they could be squeezed to "open" the barrel reducing the friction on the chain to allow them to be more easily moved then returning to their at rest shaped gripping the chain when released.

The above and other objects, advantages, and novel features of the invention will be more fully understood from the following detailed description and the accompanying drawings, in which:

BRIEF DESCRIPTION OF THE DRAWINGS

FIG. 1 is a plan view of an adjustable length necklace constructed according to the invention.

FIG. 2 is a sectional view taken at 2—2 of FIG. 1.

FIG. 3 is a sectional view taken at 3—3 of FIG. 1.

FIG. 4 is a sectional view taken at 4—4 of FIG. 1.

FIG. 5 is a plan view illustrating adjustment of the link of the necklace from a minimum to a maximum.

FIG. 6 is an enlarged view illustrating the connection of the chain to the barrel.

FIG. 7 is a sectional view similar to FIG. 4 illustrating an optional embodiment.

DETAILED DESCRIPTION OF THE INVENTION

Figures 8, 9:
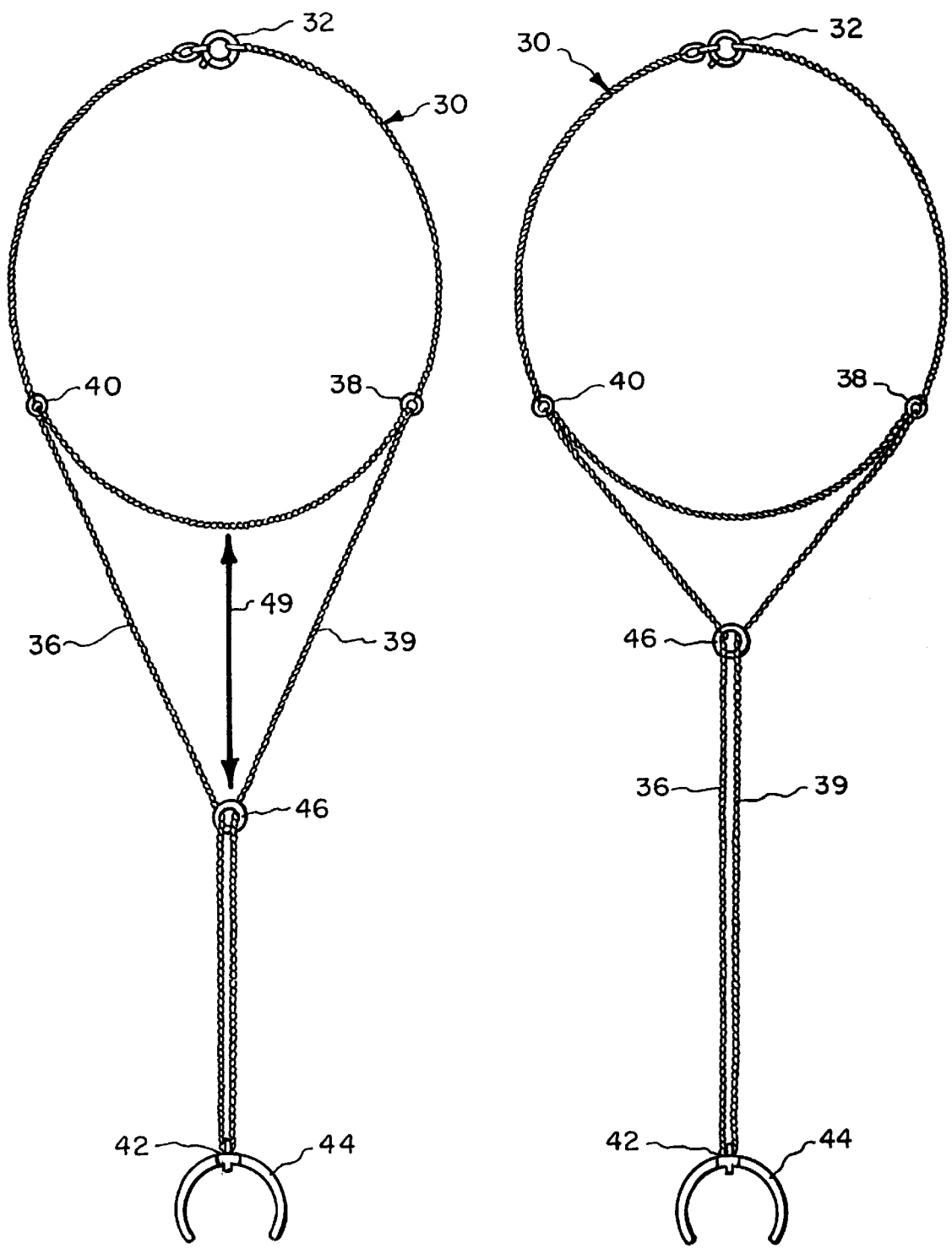
FIG. 8 is an elevational view of a jewelry design comprising a bracelet to be worn on an ankle or wrist linked by a jeweled chain to a ring for a toe or finger.
FIG. 9 is an elevational view similar to FIG. 8 illustrating a chain tension adjusting ring.

An adjustable length necklace 10 is illustrated in FIG. 1 and is comprised of a chain 11 having a plurality of links 12 passing through slidable oval-shaped barrels 14 and 16 as illustrated in FIGS. 2 and 3. Links 12 of chain 11 form a continuous loop passing through each barrel and wrapping around to be fastened to an aperture 18 in the side wall of respective barrels 14 and 16. Oval-shaped barrels 14 and 16 are preferably identical barrels slidable on links 12 of necklace 10. The unique oval shape of the barrels 14 and 16 improve their function and appearance. Since these necklaces generally use very small links the barrels must also be small. The oval shape of barrels makes it easier to grasp and slide them. Additionally, the oval shape reduces their silhouette so they do not detract from the aesthetic appearance of the necklace.

In each case an end loop 20 of chain 12 is attached to each barrel 14 and 16 bypassing through apertures 18. This allows barrels 14 and 16 to be smoothly slidable on chain links 12 toward or away from each other to maximize or minimize the diameter of chain necklace 10.

Preferably barrels 14 and 16 are oval-shaped in construction as illustrated in FIGS. 4 and 6 and are filled with a resilient retaining material 22 such as a high density polyethylene, such as Chevron PE, manufactured by Chevron Chemical Company, to grip links of chain 12 to maintain the position of barrels 14 and 16 at an adjusted position. Polyethylene was selected and is preferred because other resilient materials can wear or catch on the links and hamper adjustment of barrels 14 and 16. This material provides sufficient restraining force while allows barrels to slide easily on the chain. This material also has a resilient retention memory factor and does not compress or lose its resilience over a period of time.

Also, preferably oval-shaped barrels are constructed of a memory metal that is resistant to deformation. Generally thin metal parts such as clasps, etc. on necklaces are fragile and easily deformed or bent by frequent use and excessive force. Oval-shaped barrels are constructed of a memory metal such as a nickel-titanium alloy. The memory metal should be suitable for plating with one of the precious metals such as gold. A memory metal suitable for use in the oval-shaped barrels 16 is disclosed and described in U.S. Pat. No. 4,896,955 of Zider et al, issued Jan. 30, 1990 and incorporated herein by reference.

The length of the necklace is adjusted as illustrated in FIG. 5. Oval-shaped barrels 14 and 16 are slidable on necklace 1o toward each other as illustrated in FIG. 5 until they meet. At a minimum position chain linked 10 forms an elegant overlapping double loop and a minimum diameter necklace. At the other extreme with barrels 14 and 16 adjusted, chain 11 forms a continuous single loop having a maximum diameter. The resilient polyethylene material 22 in barrels 14 and 16 allow adjustment of necklace 10 to minimum, maximum, or anywhere in between. Barrels 14 and 16 will hold their position at the suitable adjusted length.

An optional embodiment is illustrated in FIG. 7 that includes a clasp or connector 25 mounted between barrel link 20 and first link 21 of chain 12. Clasp 25 allows chain 12 to be opened for the addition of pendants or other ornamentation to necklace 10. Clasp 25 is comprised of a cylinder 27 having a threaded shaft or post 29 engaging a second cylinder 31 having a threaded socket 33. Clasp 25 is attached to links 20 and 21 by swivels 35. While a clasp comprised of a threaded post 29 and threaded socket 31 is shown, other types of clasp could be used. For example, link 21 could include a retractable spring biased clasp that opens to receive link 20.

The length or size of the necklace is adjusted by grasping barrels 14 and 16 and sliding them on the necklace from one extreme to a double loop necklace at a minimum diameter to the other extreme or maximum diameter forming a single loop. The construction shown allows the necklace to be worn without the need for any clasp. The necklace can be adjusted to a maximum diameter and placed around the neck of the wearer and then adjusted to the length or diameter desired by sliding barrels 14 and 16 on chain 11.

FIGS. 8 through 11 illustrate a construction of a bracelet that can be worn on the ankle or wrist in combination with a ring. The adjustable length employing barrels 14 and 16 is equally applicable to the chains that encircles the ankle in the embodiments of FIGS. 8 through 11. FIG. 8 illustrates a bracelet 30 having a clasp 32 linked to chains 34 and 36 by eyelets 38 and 40 and secured to eyelet 40 on ring 44. Ring 44 is shown as having an open side but could be closed ring if desired.

Bracelet 30 can be placed on the wrist or ankle and ring 42 placed on a finger or toe. Adjustable ring 46 allows chains 34 and 36 to be tightened by sliding ring up or down as illustrated at 49. Sliding ring 46 toward or away from ring 44 tightens chains on the wearer as illustrated in FIG. 9. Clasp 32 is a conventional clasp used on most necklaces and bracelets. It is opened by sliding a latch to secure clasp and bracelet around the ankle or wrist of the wearer.

Figures 10, 11:
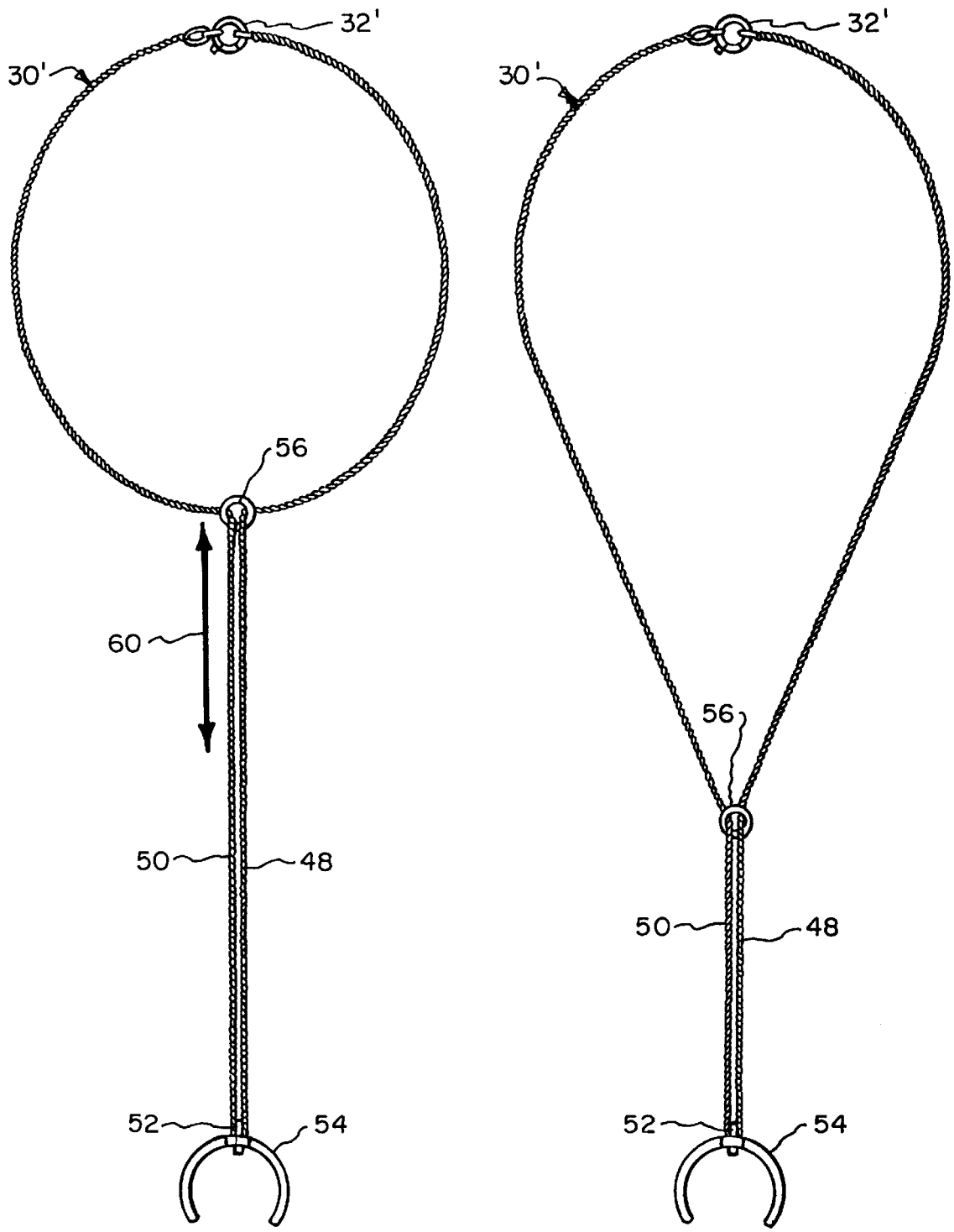
FIG. 10 is an elevational view of an optional embodiment of the linked bracelet and ring of FIG. 8.
FIG. 11 is an elevational view of the optional embodiment of FIG. 10 illustrating tension adjustment of the chain.

An optional construction is illustrated in FIGS. 10 and 11. In this embodiment bracelet 30' has a clasp 32' as before but is comprised of a pair of continuous chains 48 and 50 linked to an eyelet 52 on ring 54. Chains 48 and 50 pass through an adjustable ring 56 and are attached to a clasp 32'.

In this embodiment chain 48 and 50 are attached to ring 54 at one end and to clasp 32' at the other end. Adjustable ring 56 allows the loop forming the bracelet to be adjusted as illustrated in FIG. 10 to fit snugly around a wrist or ankle or adjusted to an enlarged ring as shown in FIG. 11. Adjustment is made by sliding ring 56 toward or away from ring 54 as indicated by arrow 60. This allows the size or tightness of the bracelet to be adjusted for the convenience of the wearer.

Thus there has been disclosed a novel and unique adjustable length bracelet having a simple, elegant construction comprised of a pair of oval-shaped barrels mounted on the chain forming a continuous loop with the terminating link of the chain attached to each barrel by passing through an aperture in the side of the barrel. Each barrel is filled with a resilient material such as polyethylene to allow the barrels to be smoothly adjusted and positioned along the chain to adjust the length of the necklace from a minimum toga maximum or anywhere in between.

Also described is a unique ankle or wrist bracelet attached to a toe or finger ring by a chain link. The continuous loop embodiment and oval-shaped barrels can be equally applied to the chain in this embodiment that encircles the wrist or ankle. In one embodiment the toe or finger ring is attached to a bracelet by a pair of chains attached to loops in the bracelet. In another embodiment the toe or finger ring is attached by continuous chains to a clasp for fastening to the wrist or ankle. The bracelet may be tightened or loosened by a ring slidable on the chains linking the ring or the bracelet.

This invention is not to be limited by the embodiment shown in the drawings and described in the description which is given by way of example and not of limitation, but only in accordance with the scope of the appended claims.

What is claimed is:

1. An adjustable length necklace comprising;

a chain; said chain formed by a plurality of links;

a first oval-shaped barrel slidably mounted on said chain;

a second oval-shaped barrel slidably mounted on said chain;

a resilient high density polyethylene material inside each of said first and second barrels to resiliently grip and hold said first and second barrels in an adjusted position;

a first end of said chain being attached to said first oval-shaped barrel;

a second end of said chain being attached to said second oval-shaped barrel;

said oval-shaped barrels are constructed of a deformation resistant shape-memory alloy;

whereby said first and second oval-shaped barrels may be squeezed and moved along said chain from a first position to maximize the length of said necklace to a second position to minimize the length of said necklace; said barrels retaining their oval-shape when released.

2. The adjustable length necklace of claim 1 in which said shape-memory alloy is a nickel-titanium based shape-memory alloy.

3. The adjustable length necklace of claim 1 in which said chain is attached to said barrels by the last link in each end of said chain, said last link in each end of said chain is attached to the respective first and second barrel by said last link passing through an aperture in an end of each of said first and second barrels; and a clasp between one of said last links in one end of said chain and an adjacent link whereby said chain may be opened to add ornamental articles to said necklace; said clasp comprising, a first cylinder having a threaded post; and a second cylinder having a threaded socket for receiving said threaded post, each of said first and second cylinders being connected to said respective last link and adjacent link in said chain by a swivel.

* * * * *